(12) United States Patent
Hsu et al.

(10) Patent No.: US 9,598,793 B2
(45) Date of Patent: Mar. 21, 2017

(54) ELECTROSPINNING DEVICE

(71) Applicant: NATIONAL CHIAO TUNG UNIVERSITY, Hsinchu (TW)

(72) Inventors: Ray-Quen Hsu, Hsinchu (TW); Hsuan-Yu Huang, Chiayi (TW); Yao-Hong Cheng, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 18 days.

(21) Appl. No.: 14/928,821

(22) Filed: Oct. 30, 2015

(65) Prior Publication Data

US 2016/0348278 A1    Dec. 1, 2016

(30) Foreign Application Priority Data

May 29, 2015  (TW) .............................. 104117412 A

(51) Int. Cl.
| | | |
|---|---|---|
| B29C 33/04 | (2006.01) | |
| D01D 5/00 | (2006.01) | |
| B29C 47/00 | (2006.01) | |
| B29C 47/08 | (2006.01) | |
| B29K 67/00 | (2006.01) | |

(52) U.S. Cl.
CPC ....... *D01D 5/0076* (2013.01); *B29C 47/0076* (2013.01); *B29C 47/0898* (2013.01); *B29K 2067/046* (2013.01)

(58) Field of Classification Search
CPC .............. D01D 5/0076; B29C 47/0076; B29C 47/0898
See application file for complete search history.

(56) References Cited

U.S. PATENT DOCUMENTS 4,842,505 A  *  6/1989  Annis .................. D01D 5/0069
                                                      264/164

\* cited by examiner

*Primary Examiner* — Joseph S Del Sole
*Assistant Examiner* — John Robitaille
(74) *Attorney, Agent, or Firm* — Faeger Baker Daniels LLP

(57) ABSTRACT

An electrospinning device includes a rotatable carrier, a collector unit including at least one collector bar, a dispenser for dispensing a polymer composition, and a power supply. The collector bar is disposed on the rotatable carrier and is rotatable about a longitudinal axis. The power supply is configured to produce a potential difference between the dispenser and the collector bar so as to permit the polymer composition to erupt from the dispenser as a jet of the polymer composition toward the collector bar to thereby permit the resultant electrospun fibers to be collected on the collector bar. By rotating the rotatable carrier at a relatively fast speed, the electrospun fibers are drawn to be arranged along the longitudinal axis.

8 Claims, 6 Drawing Sheets

ELECTROSPINNING DEVICE

CROSS-REFERENCE TO RELATED APPLICATION

This application claims priority from Taiwanese application no. 104117412, filed on May 29, 2015, the disclosure of which is expressly incorporated by reference herein in its entirety.

1. FIELD

The disclosure relates to a device for producing synthetic fibers, more particularly to an electrospinning device for producing electrospun fibers.

BACKGROUND

U.S. Pat. No. 8,057,535 discloses a conventional electrospinning device 1 as shown in FIG. 1. The electrospinning device 1 includes a mandrel 11, a spinneret 10 for dispensing a polymer fluid, and a reservoir 12 for holding the polymer fluid. The mandrel 11 can be driven to rotate, and the spinneret 10 can reciprocate along a longitudinal direction of the mandrel 11 to create a layer of polymer fibers on the mandrel 11. However, because the speed of the reciprocating movement of the spinneret 10 is not sufficient to enable the polymer fibers to be arranged along the longitudinal direction of the mandrel 11, and because the spinneret 10 is likely to vibrate during the reciprocation thereof, the polymer fibers have a poor orientation along the longitudinal direction of the mandrel 11.

Another conventional electrospinning device 2 is shown in FIG. 2, and has been disclosed in an article entitled "Electrospinning of small diameter 3-D nanofibrous tubular scaffolds with controllable nanofiber orientations for vascular grafts" (J. Mater. Sci.: Mater. Med. (2010) 21:3207-3215). The electrospinning device 2 includes a motor 20, an electro-insulator Teflon rod 21, two metallic plates 22, and a spinneret 23. The two metallic plates 22 are separately placed. The electro-insulator Teflon rod 21 has two segments disposed respectively and rotatably on the metallic plates 22 as a collector of electrospun nanofibers and is driven to rotate by the motor 20. When the metallic plates 22 are connected to a DC negative voltage power supply and a high voltage is applied to a polymer solution in the spinneret 23, electrospun nanofibers of axial orientation can be formed on the Teflon rod 21 by regulating the electric fields through the two separately placed metallic plates 22. After removal of the Teflon rod 21, an electrospun 3-D nanofibrous tubular scaffold is obtained. In the electrospinning device 2, since the two metallic plates 22 are spaced apart by a relatively small distance in order to produce the electrospun nanofibers of axial orientation, the 3-D nanofibrous tubular scaffold has a limited length.

SUMMARY

Therefore, an object of the disclosure is to provide a novel electrospinning device by which a plurality of longitudinally oriented electrospun fibers can be formed. The longitudinally oriented electrospun fibers can be formed into a tubular structure having a desired length. The tubular structure can be used as an implantable medical device.

According to the disclosure, an electrospinning device for producing electrospun fiber from a polymer composition includes a rotatable carrier, a collector unit, first and second drive units, a dispenser, and a power supply. The rotatable carrier is rotatable about a central axis, and includes a mount segment having two opposite regions and a central point that is disposed between the two opposite regions and that defines a circular running route about the central axis when the rotatable carrier rotates. The collector unit includes at least one collector bar which extends along a longitudinal axis to terminate at two opposite ends, which has a middle point between the two opposite ends, and which is rotatable about the longitudinal axis. The opposite ends of the collector bar is respectively mounted to the two opposite regions of the mount segment such that the longitudinal axis is tangent to a reference circular line at the middle point. The reference circular line surrounds and is concentric with the circular running route. The first drive unit is coupled to the rotatable carrier so as to drive the rotatable carrier to rotate about the central axis. The second drive unit is disposed on the rotatable carrier and is coupled to the collector bar so as to drive the collector bar to rotate about the longitudinal axis. The dispenser is configured to dispense the polymer composition. The power supply is configured to produce a potential difference between the dispenser and the collector bar so as to permit the polymer composition in the dispenser to erupt from the dispenser as a jet of the polymer composition traveling toward the collector bar to thereby permit the resultant electrospun fiber to be collected on the collector bar. The rotatable carrier is set to rotate about the central axis at a first speed, such that a plurality of longitudinally oriented electrospun fibers are formed on the collector bar.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
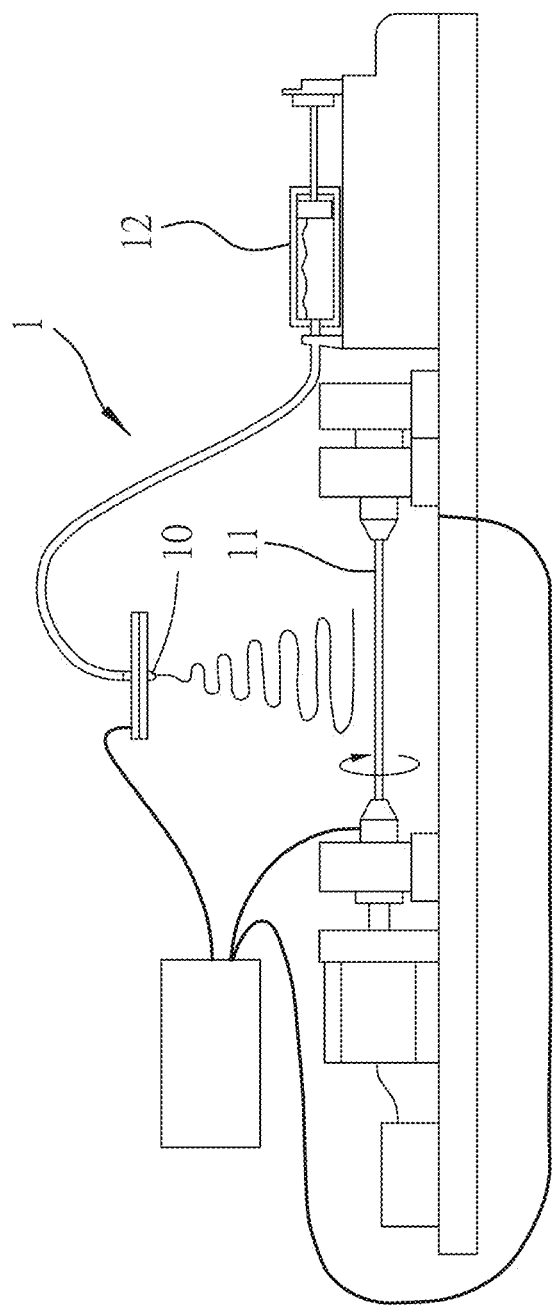
FIG. 1 is a schematic view of a conventional electrospinning device.
Figure 2:
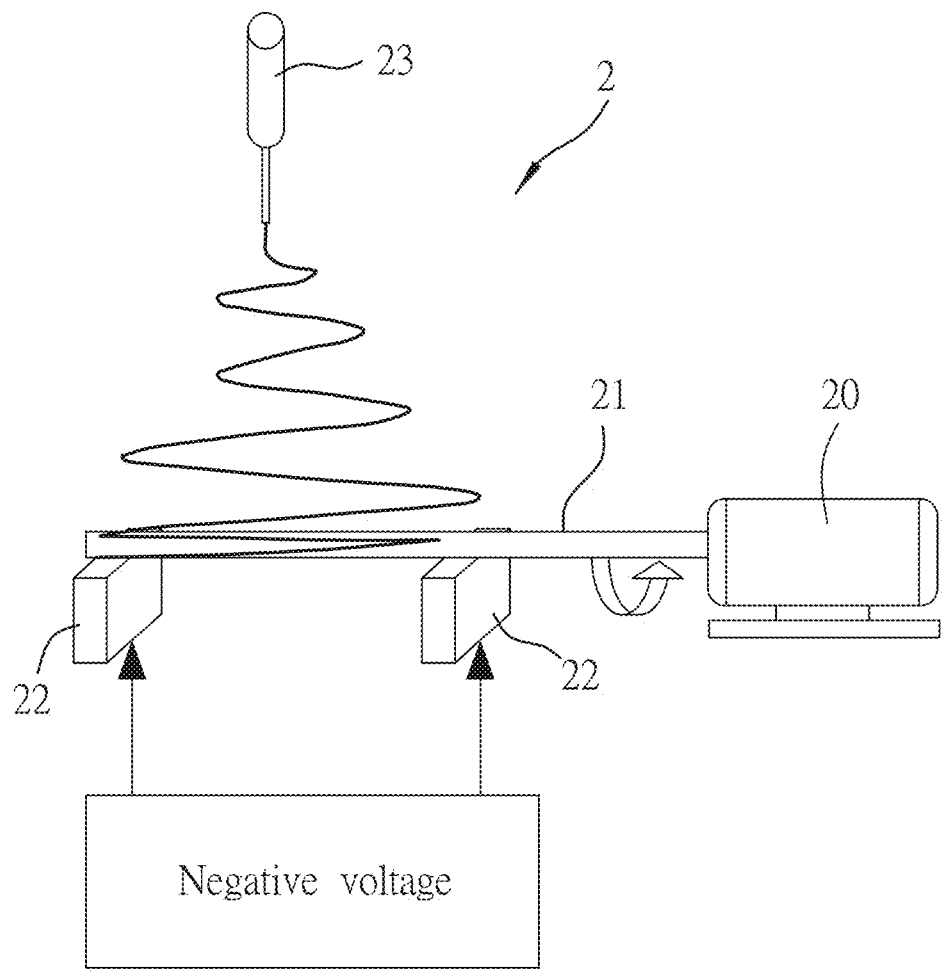
FIG. 2 is a schematic view of another conventional electrospinning device.
Figure 3:
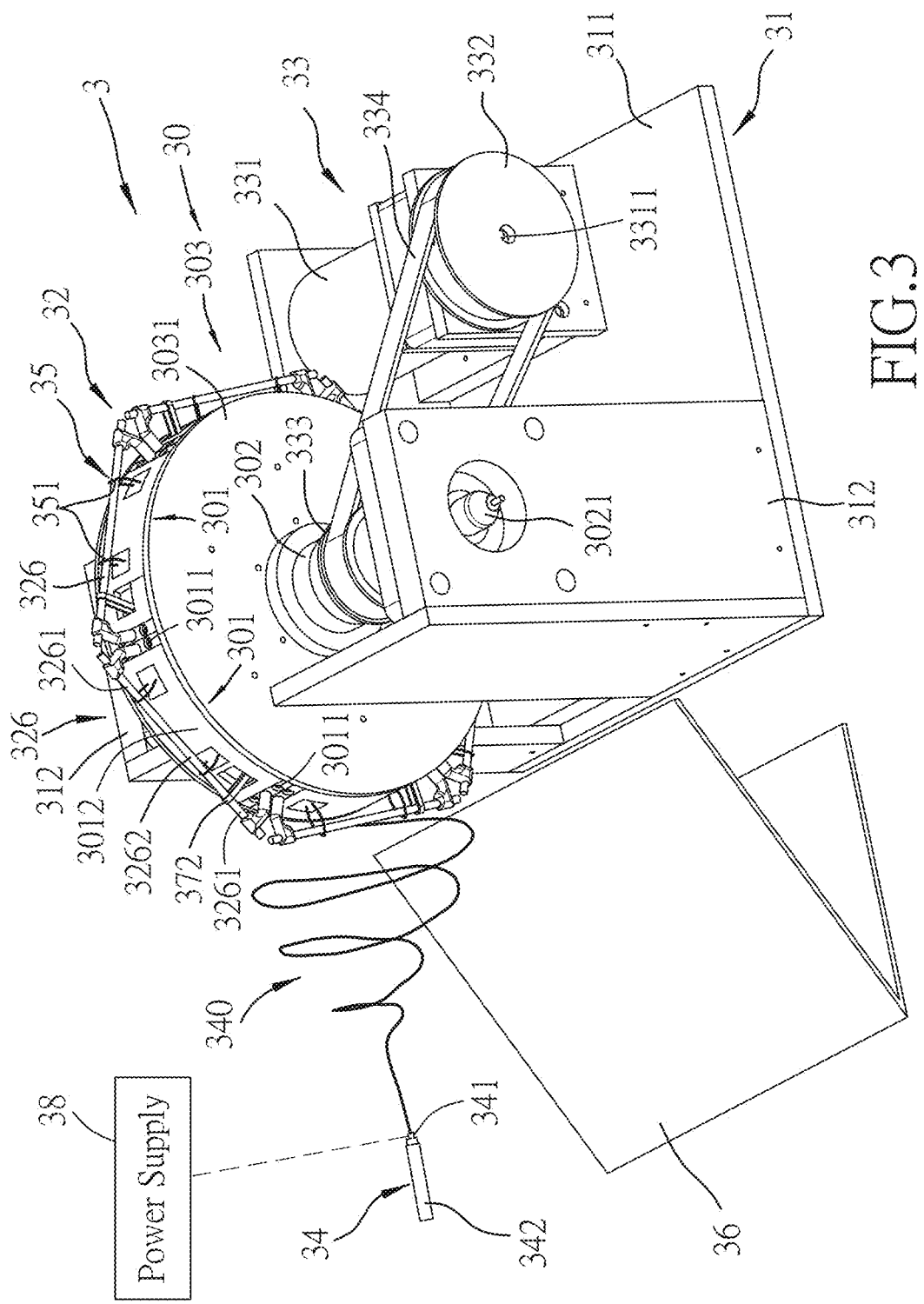
FIG. 3 is a perspective view of an electrospinning device according to an embodiment of the disclosure.
Figure 4:
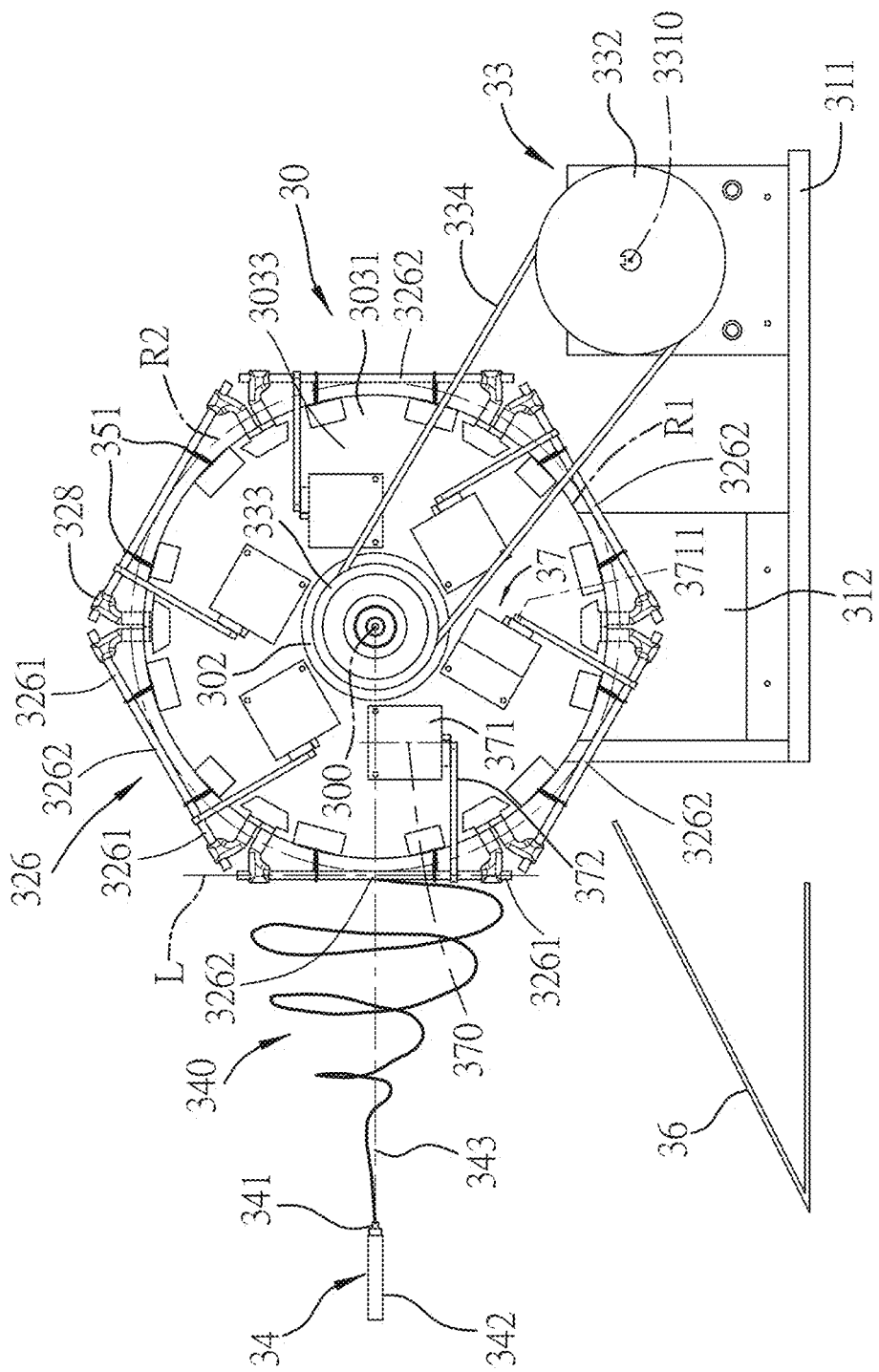
FIG. 4 is a schematic view illustrating a drive unit disposed inside a rotatable carrier of the electrospinning device shown in FIG. 3.

With reference to FIGS. 3 and 4, an electrospinning device 3 according to an embodiment of the disclosure is used for producing an electrospun fiber from a polymer composition, and includes a rotatable carrier 30, a support 31, a collector unit 32, a first drive unit 33, a second drive unit 37, a dispenser 34, at least one heat cutting unit 35, a draft barrier 36, and a power supply 38.

As shown in FIGS. 3 and 4, the rotatable carrier 30 is rotatable about a central axis 300, and includes a mount segment 301 having two opposite regions 3011 and a central point 3012 that is disposed between the two opposite regions 3011 and that defines a circular running route (R1) about the central axis 300 when the rotatable carrier 30 rotates. In this embodiment, the rotatable carrier 30 includes a wheel axle 302 and a wheel body 303. The wheel axle 302 extends along the central axis 300 to terminate at two axle ends 3021 (only one is shown in FIG. 3). The wheel body 303 is coupled to the wheel axle 302 to rotate therewith, and includes two discs 3031 defining therebetween an accommodating space 3033. The mount segment 301 is connected to marginal regions of the discs 3031 of the wheel body 303.

The support 31 includes a base plate 311 and two support bodies 312 disposed on the base plate 311. The two axle ends 3021 are rotatably supported by the two support bodies 312, respectively.

The collector unit 32 includes at least one collector bar 326 which extends along a longitudinal axis (L) to terminate at two opposite ends 3261, which has a middle point 3262 between the two opposite ends 3261, and which is rotatable about the longitudinal axis (L). The opposite ends 3261 of the collector bar 326 are respectively mounted to the two opposite regions 3011 of the mount segment 301 by virtue of two support members 328 such that the longitudinal axis (L) is tangent to a reference circular line (R2) at the middle point 3262. The reference circular line (R2) surrounds and is concentric with the circular running route (R1).

The first drive unit 33 is coupled to the rotatable carrier 30 so as to drive the rotatable carrier 30 to rotate about the central axis 300. In this embodiment, the first drive unit 33 includes a first motor 331, a drive pulley 332, a driven pulley 333, and a first belt 334. The first motor 331 is disposed on the base plate 311, and has a first output shaft 3311 rotatable about a first shaft axis 3310 substantially parallel to the central axis 300. The drive pulley 332 is coupled for rotation with the first output shaft 3311. The driven pulley 333 is coupled for rotation with the wheel axle 302 of the rotatable carrier 30 so as to be coaxially rotatable with the rotatable carrier 30. The first belt 334 is trained on the drive and driven pulleys 332, 333 to permit the driven pulley 333 to be driven by the drive pulley 332 to thereby allow the rotatable carrier 30 to be driven by the first drive unit 33.

As shown in FIG. 4, the second drive unit 37 is disposed on the rotatable carrier 30 and is coupled to the collector bar 326 so as to drive the collector bar 326 to rotate about the longitudinal axis (L). In this embodiment, the second drive unit 37 includes a second motor 371 and a second belt 372. The second motor 371 is disposed on one of the discs 3031 and in the accommodating space 3033, and has a second output shaft 3711 rotatable about a second shaft axis 370 substantially parallel to the longitudinal axis (L) of the collector bar 326. The second belt 372 is trained on the second output shaft 3711 and the collector bar 326 to permit the collector bar 326 to be driven by the second output shaft 3711.

The dispenser 34 is configured to dispense the polymer composition. In this embodiment, the polymer composition includes polylactic acid and chloroform. The dispenser 34 includes a nozzle 341 and a reservoir 342 for holding the polymer composition. The nozzle 341 and the central axis 300 define therebetween a reference line 343 which passes through the reference circular line (R2). When the middle point 3262 is in the reference line 343, the reference line 343 is perpendicular to the longitudinal axis (L).

The power supply 38 is configured to produce a potential difference between the dispenser 34 and the collector bar 326 so as to permit the polymer composition in the dispenser 34 to erupt from the nozzle 341 of the dispenser 34 as a jet of the polymer composition 340 traveling toward the collector bar 326 to thereby permit the resultant electrospun fiber to be collected on the collector bar 326.

The draft barrier 36 is disposed to prevent a draft of air created as a result of rotation of the rotatable carrier 30 from reaching the jet of the polymer composition 340.

The heat cutting unit 35 includes two heat cutting members 351 which are slidably disposed on the two opposite ends 3261 of the collector bar 326, respectively, so as to cut the longitudinally oriented electrospun fibers at the two opposite ends 3261 of the collector bar 326. The heat cutting members 351 can be made of metal filaments.

In this embodiment, the power supply 38 applies a high voltage to the nozzle 341 of the dispenser 34, the collector bar 326 is grounded through one of the two axle ends 3021 of the wheel axle 302, and electrical power is supplied through the other one of the two axle ends 3021 to the second drive unit 37 and the heat cutting unit 35.

The rotatable carrier 30 is set to rotate about the central axis 300 at a first speed which is fast enough to draw the electrospun fibers to be arranged on the collector bar 326 along the longitudinal axis (L). Thus, a plurality of longitudinally oriented electrospun fibers, i.e., a plurality of axially-aligned electrospun fibers, can be collected on the collector bar 326. In this embodiment, the middle point 3262 of the collector bar 326 has a tangential speed relative to the central axis 300 not less than 0.942 m/s when the rotatable carrier 30 rotates at the first speed.

In addition, the collector bar 326 is set to rotate about the longitudinal axis (L) at a second speed which is much slower than the first speed so as to permit the longitudinally oriented electrospun fibers to be collected on the collector bar 326 in a tubular form.

In this embodiment, the rotatable carrier 30 includes a plurality of the mount segments 301, which are displaced from each other about the central axis 300 so as to permit the central points 3012 of the mount segments 301 to cooperatively define the circular running route (R1) when the rotatable carrier 30 rotates. Furthermore, the collector unit 32 includes a plurality of the collector bars 326, which are mounted respectively to the mount segments 301. For driving the collector bars 326, the second drive unit 37 includes a plurality of the second motors 371 and a plurality of the second belts 372. For separating the electrospun fibers 39 on the collector bars 326, a plurality of the heat cutting units 35 are provided. In addition, the second motors 371, the second belts 372, and the heat cutting units 35 correspond to the collector bars 326 in number. As shown in FIGS. 3 and 4, six collector bars 326 are provided in this embodiment.

By virtue of the electrospinning device 3 according to the disclosure, a plurality of tubular structures formed by the axial-aligned electrospun fibers can be fabricated simultaneously. In addition, by adjusting the size of the rotatable carrier 30, the length of the collector bars 326 can be adjusted. Furthermore, by sliding the heat cutting members 351 to desired positions on the collector bars 326 to cut desired lengths of the electrospun fibers 39, tubular structures with a desired length can be obtained.

An experiment was conducted to demonstrate the fabrication of a tubular structure of electrospun fibers using the electrospinning device 3 shown in FIGS. 3 and 4. In the electrospinning device 3, a shortest distance between the longitudinal axis (L) of each collector bar 326 and the central axis 300 is 12 cm, and a shortest distance between an outer surface and the longitudinal axis (L) of each of the collector bars 326 is 2 mm.

In this experiment, the potential difference between the dispenser 34 and each collector bar 326 was set to 7200V (the potential difference ranged from 7000V to 7500V). A polymer composition for electrospinning included polylactic acid (14 wt %) dispersed in chloroform. A shortest distance between the nozzle 341 and the middle point 3262 of each collector bar 326 was set to be 10 cm. The flow rate of the polymer composition in the reservoir 342 was 1.5 ml/hr. In Examples 1 to 7, the rotation speeds of the rotatable carrier 30 and each collector bar 326 were listed in Table 1. For each example, a first tangential speed of the middle point 3262 of each collector bar 326 relative to the central axis 300 and a second tangential speed of an outer surface of each collector bar 326 relative to the respective longitudinal axis (L) were calculated and listed in Table 1. An average diameter of the electrospun fibers collected on each collector bar 326 in each example is also listed in Table 1.

TABLE 1

| Example | Rotation speed (rpm) | | First tangential speed (m/s) | Second tangential speed (m/s) | Fiber diameter (μm) |
|---|---|---|---|---|---|
| | Rotatable carrier | Collector bar | | | |
| 1 | 50 | 10 | 0.628 | 0.0021 | 9.8 |
| 2 | 75 | 10 | 0.942 | 0.0021 | 10.5 |
| 3 | 100 | 10 | 1.256 | 0.0021 | 10.5 |
| 4 | 150 | 10 | 1.884 | 0.0021 | 9.3 |
| 5 | 200 | 10 | 2.512 | 0.0021 | 8.8 |
| 6 | 300 | 10 | 3.768 | 0.0021 | 4.1 |
| 7 | 400 | 10 | 5.024 | 0.0021 | 3.3 |

* First tangential speed (m/s) = [rotation speed of the rotatable carrier (rpm)/60] × $2\pi r_1$
* Where $r_1$ is a shortest distance between the longitudinal axis (L) of each collector bar 326 and the central axis 300.
* Second tangential speed (m/s) = [rotation speed of each collector bar (rpm)/60] × $2\pi r_2$
* Where $r_2$ is a shortest distance between an outer surface and the longitudinal axis (L) of each of the collector bars 326

Figure 5:
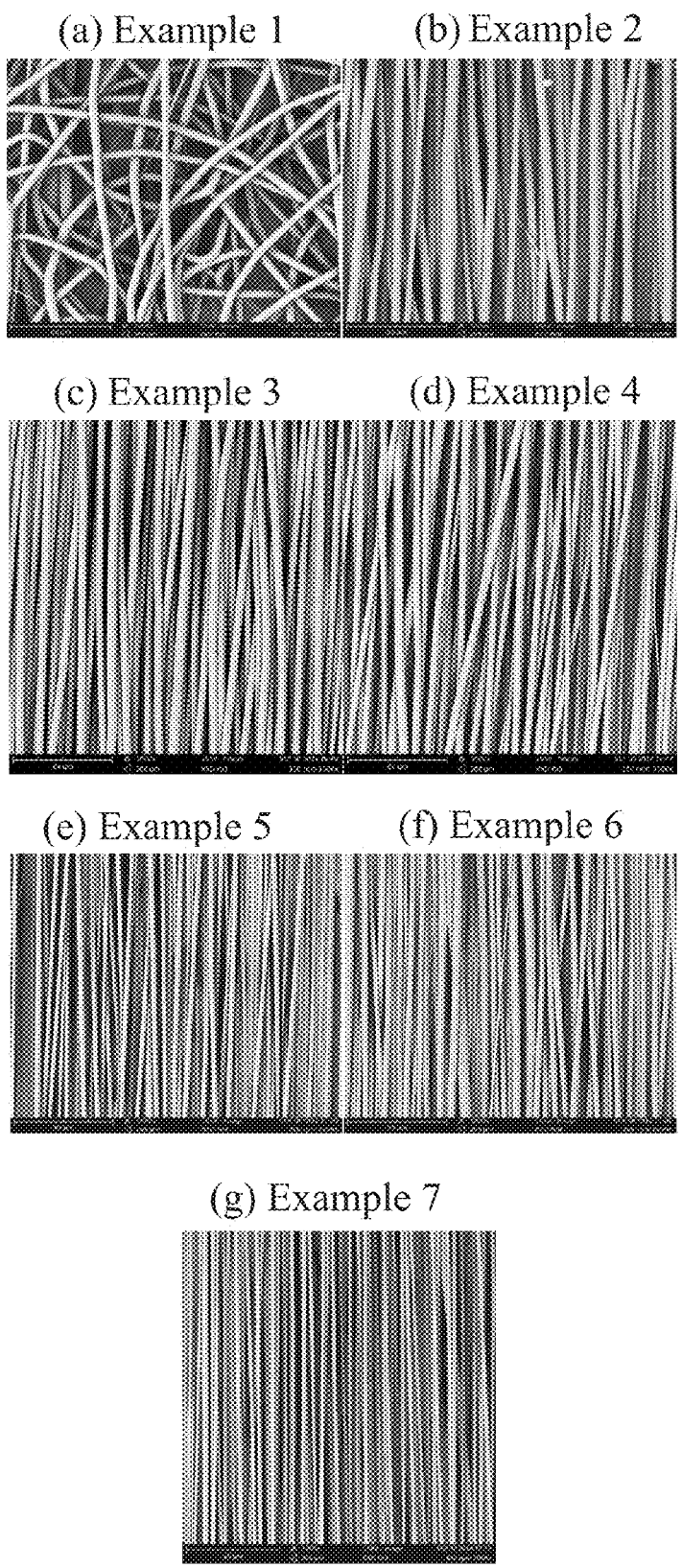
FIG. 5 shows SEM pictures of electrospun fibers obtained in Examples 1 to 7.
Figure 6:
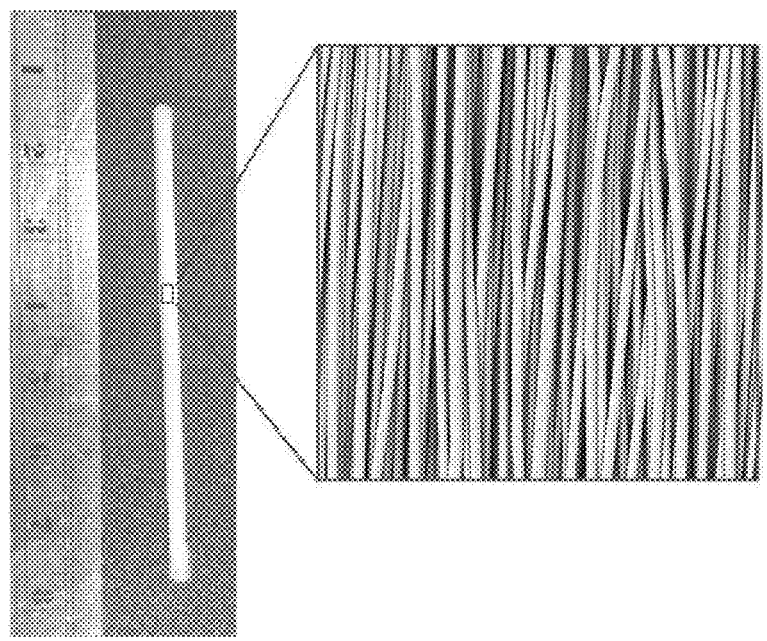
FIG. 6 shows a picture of a tubular structure made using the electrospinning device shown in FIG. 3, and a partially enlarged picture of the tubular structure.

When the first tangential speed was less than 0.942 m/s (Example 1), the electrospun fibers collected on each collector bar 326 were not axially oriented (i.e., not oriented along the longitudinal axis (L)) (see (a) of FIG. 5). When the first tangential speed was not less than 1.256 m/s (Examples 3 to 7), tubular structures with highly axially oriented electrospun fibers could be obtained (see (c) to (g) of FIG. 5) (in which the an angle between the electrospun fiber on each collector bar 326 and the respective longitudinal axis (L) is less than 2°). FIG. 6 shows the axially oriented electrospun fibers obtained in Example 3.

Theoretically, the second tangential speed should be less than 0.044 m/s (1.256 m/s × tan(2°=0.044 m/s) when the first tangential speed is not less than 1.256 m/s in order to obtain tubular structures with highly axially oriented electrospun fibers. In Examples 3 to 7, the second tangential speed was 0.0021 m/s (less than 0.044 m/s) and tubular structures with highly axially oriented electrospun fibers were obtained.

Alternatively, by driving each collector bar 326 to rotate clockwise and counterclockwise alternately, a tubular structure with electrospun fibers arranged in a crisscrossed pattern may be formed on each collector bar 326, in which an angle between each electrospun fiber and the longitudinal axis (L) of the respective collector bar 326 is greater than 2°. In this case, the first tangential speed may be greater than 1.256 m/s, and the second tangential speed may be greater than 0.044 m/s. Tubular structures with crisscrossed fibers facilitate adhesion, migration, and proliferation of fusiform cells when they are used as implantable vascular prostheses.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An electrospinning device for producing an electrospun fiber from a polymer composition, comprising:
    a rotatable carrier which is rotatable about a central axis, and which includes a mount segment having two opposite regions and a central point that is disposed between said two opposite regions and that defines a circular running route about the central axis when said rotatable carrier rotates;
    a collector unit including at least one collector bar which extends along a longitudinal axis to terminate at two opposite ends, which has a middle point between said two opposite ends, and which is rotatable about the longitudinal axis, said opposite ends of said collector bar being respectively mounted to said two opposite regions of said mount segment such that the longitudinal axis is tangent to a reference circular line at said middle point, the reference circular line surrounding and being concentric with the circular running route;
    a first drive unit coupled to said rotatable carrier so as to drive said rotatable carrier to rotate about the central axis;
    a second drive unit disposed on said rotatable carrier and coupled to said collector bar so as to drive said collector bar to rotate about the longitudinal axis;
    a dispenser configured to dispense the polymer composition; and
    a power supply configured to produce a potential difference between said dispenser and said collector bar so as to permit the polymer composition in said dispenser to erupt from said dispenser as a jet of the polymer composition traveling toward said collector bar to thereby permit the resultant electrospun fiber to be collected on said collector bar, wherein
    said rotatable carrier is set to rotate about the central axis at a first speed, such that a plurality of longitudinally oriented electrospun fibers are formed on said collector bar.

2. The electrospinning device according to claim 1, wherein said collector bar is set to rotate about the longitudinal axis at a second speed which is slower than the first speed so as to permit the longitudinally oriented electrospun fibers collected on said collector bar to be in a tubular form.

3. The electrospinning device according to claim 1, wherein said rotatable carrier includes a plurality of said mount segments displaced from each other about the central axis so as to permit said central points of said mount segments to cooperatively define the circular running route when said rotatable carrier rotates, said collector unit including a plurality of said collector bars mounted respectively to said mount segments.

4. The electrospinning device according to claim 1, further comprising a draft barrier disposed to prevent a draft of air created as a result of rotation of said rotatable carrier from reaching the jet of the polymer composition.

5. The electrospinning device according to claim 1, further comprising at least one heat cutting unit which includes two heat cutting members disposed respectively on said two opposite ends of said collector bar so as to cut the longitudinally oriented electrospun fibers off at said two opposite ends of said collector bar.

6. The electrospinning device according to claim 1, wherein said first drive unit includes a first motor having a first output shaft rotatable about a first shaft axis substantially parallel to the central axis, a drive pulley coupled for rotation with said first output shaft, a driven pulley coaxially rotatable with said rotatable carrier, and a first belt trained on said drive and driven pulleys to permit said driven pulley to be driven by said drive pulley to thereby allow said rotatable carrier to be driven by said first drive unit.

7. The electrospinning device according to claim 1, wherein said second drive unit includes a second motor having a second output shaft rotatable about a second shaft axis substantially parallel to the longitudinal axis of said collector bar, and a second belt trained on said second output shaft and said collector bar to permit said collector bar to be driven by said second output shaft.

8. The electrospinning device according to claim 1, wherein said middle point of said collector bar has a tangential speed relative to the central axis not less than 0.942 m/s, when said rotatable carrier rotates at the first speed.

* * * * *